(12) United States Patent
Singh et al.

(10) Patent No.: US 7,715,517 B2
(45) Date of Patent: May 11, 2010

(54) APPARATUS AND METHOD FOR SUPPORTING FUEL ASSEMBLIES IN AN UNDERWATER ENVIRONMENT HAVING LATERAL ACCESS LOADING

(75) Inventors: Krishna P. Singh, Jupiter, FL (US); Evan Rosenbaum, Marlton, NJ (US)

(73) Assignee: Holtec International, Inc.

( * ) Notice: Subject to any disclaimer, the term of this patent is extended or adjusted under 35 U.S.C. 154(b) by 0 days.

(21) Appl. No.: 11/855,110

(22) Filed: Sep. 13, 2007

(65) Prior Publication Data

US 2008/0260088 A1    Oct. 23, 2008

Related U.S. Application Data

(60) Provisional application No. 60/844,448, filed on Sep. 13, 2006.

(51) Int. Cl.
*G21C 19/00* (2006.01)
*G21F 5/00* (2006.01)

(52) U.S. Cl. .................. 376/272; 376/264; 376/268; 250/506.1; 250/507.1

(58) Field of Classification Search ............. 376/272, 376/268, 264; 250/506.1, 507.1
See application file for complete search history.

(56) References Cited

U.S. PATENT DOCUMENTS

| 4,382,060 A | 5/1983 | Holtz et al. |
|---|---|---|
| 4,626,402 A | 12/1986 | Baatz et al. |
| 4,788,029 A | 11/1988 | Kerjean |
| 4,988,473 A | 1/1991 | Mueller et al. |
| 5,019,327 A | 5/1991 | Fanning et al. |
| 5,232,657 A | 8/1993 | Kovacik et al. |
| 5,245,641 A | 9/1993 | Machado et al. |
| 5,291,532 A * | 3/1994 | Townsend et al. ........... 376/269 |
| 5,365,556 A * | 11/1994 | Mallie ....................... 376/272 |
| 5,914,994 A | 6/1999 | Wasinger et al. |
| 6,283,028 B1 | 9/2001 | Walczak |

FOREIGN PATENT DOCUMENTS

| EP | 0626699 A1 | 11/1994 |
|---|---|---|
| JP | 7012985 A | 1/1995 |

\* cited by examiner

*Primary Examiner*—Jack W. Keith
*Assistant Examiner*—Erin M Boyd
(74) *Attorney, Agent, or Firm*—The Belles Group, P.C.

(57) ABSTRACT

A fuel rack for supporting radioactive fuel assemblies in an underwater (or other submerged) environment that reduces the depth required for the pool to effectuate the fuel rack loading procedure. The fuel rack is specially designed to afford lateral loading. In one embodiment, the fuel rack comprises a body structure comprising at least one substantially vertically oriented elongated cell for receiving a nuclear fuel assembly, the body having a top, a bottom and a first lateral side; at least one elongated slot in the first lateral side of the body structure that forms a passageway into the cell through which a vertically oriented fuel assembly can be loaded; and means for supporting a fuel assembly within the cell in a substantially vertical orientation. In another embodiment, the invention is a method of laterally loading a fuel rack that utilizes rotation of the fuel assembly to secure the fuel assembly within its designated cell.

19 Claims, 15 Drawing Sheets

US 7,715,517 B2

APPARATUS AND METHOD FOR SUPPORTING FUEL ASSEMBLIES IN AN UNDERWATER ENVIRONMENT HAVING LATERAL ACCESS LOADING

CROSS-REFERENCE TO RELATED APPLICATIONS

The present application claims the benefit of U.S. Provisional Application. No. 60/844,448, filed on Sep. 13, 2006, the entirety of which is hereby incorporated by reference.

FIELD OF THE INVENTION

The present invention relates generally to apparatus and methods for loading and/or supporting radioactive fuel assemblies, and specifically to apparatus and methods for loading and/or supporting spent nuclear fuel assemblies in an underwater environment.

BACKGROUND OF THE INVENTION

In the nuclear power industry, the nuclear energy source is in the form of hollow zircaloy tubes tilled with enriched uranium, known as fuel assemblies. Upon being deleted to a certain level spent fuel assemblies are removed from a reactor. At this time, the fuel, assemblies emit extremely dangerous levels of neutrons and gamma photons (i.e., neutron and gamma radiation). It is necessary that the neutron and gamma radiation emitted from spent fuel assemblies be adequately contained at all times upon being removed from the reactor. Because water is an excellent radiation absorber, spent fuel assemblies are typically submerged under water in a pool promptly after being removed from the reactor. The pool water also serves to cool the spent fuel assemblies, which can initially give off dangerous amounts of heat that must be drawn away from the fuel assemblies.

Fuel storage racks that hold a plurality of spent fuel assemblies are typically used to support the spent fuel assemblies in the underwater environment of the pool. It is generally desirable that fuel storage racks support the fuel assemblies in a vertical orientation. Each fuel assembly is placed in a separate cell so that the fuel assemblies are shielded from one another. The cells are usually elongated vertical cavities which are open at their top ends for receiving the fuel assembly daring a loading procedure. An example of a typical existing fuel rack, is described in U.S. Pat. No. 4,382,060, to Maurice Holtz et al., issued May 3, 1983, the entirety of which is hereby incorporated by reference.

During a typical underwater loading procedure of existing fuel racks, an empty fuel rack is first submerged in a fuel pool. The fuel rack must be sufficiently tall so that its cells can receive the entire length of the fuel assemblies to be loaded therein. Initially, a fuel assembly is positioned above the fuel rack in a vertical orientation and in alignment with the cell into which it will be loaded. Once the proper alignment is achieved, the fuel assembly is lowered into the cell. The fuel assembly maintains a vertical orientation during the entire loading process. For safety purposes, the entire fuel assembly must remain submerged within the water of the pool at all times. Thus, the depth of the pool must at a minimum be equal to the combined height of the fuel rack and the height of the fuel assembly (plus a margin of safety).

This minimum depth requirement for the underwater loading procedure presents problems for a number of facilities. In some instances, the fuel pool itself may not be deep enough to accommodate the combined height of the fuel rack and the fuel assembly. In other instances the temporary holding pools may not be adequately deep to perform the loading procedure in a safe manner.

SUMMARY OF THE INVENTION

It is, therefore, an object of the present invention to provide a fuel rack that can be loaded without positioning the fuel assemblies above the fuel rack.

Yet another object of the present invention is to provide a fuel rack that can be laterally loaded.

Yet another object of the present invention is to provide a fuel rack that can be loaded in shallow pool environments.

Still another object of the present invention is to provide a fuel rack that can withstand high inertia loads acting in concert with hydraulic loads from moving water.

A further object of the present invention is to provide a fuel rack that can be laterally loaded while still providing adequate lateral restraints to fuel assemblies once loaded.

A yet further object of the present invention is to provide a fuel rack that eliminates the need for neutron absorber plates.

Still another object of the present invention is to provide a fuel rack that is easy to manufacture.

It is a further object of the present invention to provide a novel method of loading spent fuel assemblies into a fuel rack in an underwater environment.

Yet another object of the present invention is to provide a method of laterally loading spent fuel assemblies into a fuel rack.

Another object of the present invention is to provide a fuel rack that is compact and maximizes the storage space of a fuel pool.

A yet further object of the present invention is to provide a fuel rack that resists water corrosion.

Still another object of the present invention is to provide a fuel rack that maintains structural stability under radiation exposure.

These and other objects are met by the present invention, which in one embodiment can be an apparatus for supporting nuclear fuel assemblies comprising: a body structure comprising at least one substantially vertically oriented elongated cell for receiving a nuclear fuel assembly, the body having a top, a bottom and a first lateral side; at least one elongated slot in the first lateral side of the body structure that forms a passageway into the cell through which a vertically oriented fuel assembly can be loaded; and means for supporting a fuel assembly within, the cell in a substantially vertical orientation.

In another embodiment, the invention may be an apparatus for supporting a plurality of radioactive fuel assemblies having a substantially rectangular horizontal cross-section having a width and a diagonal, the apparatus comprising: a plurality of plates forming a gridwork of substantially vertically oriented cells for receiving the fuel assemblies, the cells having a rectangular horizontal cross-section having a width that is greater than the diagonal of the fuel assemblies, the plurality of plates extending from a base having means for supporting the fuel assemblies in a substantially vertical orientation within the cells; a plurality of elongated slots that provide lateral access into the cells, the slots having a width; and wherein the width of the slot is greater than the width of the fuel assemblies and less than the diagonal of the fuel assemblies.

In yet another embodiment, the invention can be an apparatus for supporting fuel assemblies comprising: a base; a central wall positioned atop the base in a substantially vertical orientation, the central wall having first and second opposing surfaces; a first set of secondary walls extending from the first surface of the central wall in a rectilinear and spaced configuration so as to form a first row of vertically oriented cells; a second set of secondary walls extending from the second surface of the central wall in a rectilinear and spaced configuration so as to form a second row of vertically oriented cells; and for each cell, an elongated vertically oriented slot that provides lateral access into that cell from outside of the apparatus.

In still another embodiment, the invention can be a method of loading an elongated fuel assembly having an axis and at least a portion having a substantially rectangular square cross-section having a width and a diagonal into a fuel rack in an underwater environment, the method comprising: a) providing a fuel rack in a pool of water, the fuel rack comprising at least one cell having a rectangular horizontal cross-section having a width that is greater than the diagonal of the fuel assembly; an elongated slot on a lateral side of the fuel rack that forms a passageway into the cell, the slot having a width; and wherein the width of the slot is greater than the width of the fuel assembly and less than the diagonal of the fuel assembly; b) positioning the fuel assembly laterally adjacent to the elongated slot of the fuel rack so that the axis of the fuel assembly is substantially aligned with the slot and the width of the fuel assembly is substantially parallel with the width, of the slot; c) translating the fuel assembly in a lateral direction through the slot and into the cell, the width of the fuel assembly passing through the width of the slot; and d) rotating the fuel assembly for an angle Θ about the axis of the fuel assembly so that the diagonal of the fuel assembly prohibits the fuel assembly from being translated back through the slot.

In a further embodiment, the invention can be a method of laterally loading an elongated fuel assembly into a fuel rack.

In an even further embodiment, the invention can be an apparatus for supporting fuel assemblies that affords lateral loading.

In still another aspect, the invention can be an apparatus for supporting an elongated fuel assembly having an axis, the apparatus comprising: a body structure comprising at least one cell for receiving an elongated fuel assembly, the body having a top, a bottom and a first lateral side; an elongated slot in the first lateral side of the body structure forming a lateral passageway into the cell; and means for supporting the fuel assembly within the cell.

In a still farther aspect, the invention can be a method of loading an elongated fuel assembly having an axis and at least a portion having a substantially rectangular horizontal cross-section having a width and a diagonal into a fuel rack in an underwater environment, the method comprising: a) providing a fuel rack in a pool of water, the fuel rack comprising a body structure comprising at least one elongated cell, a top, a bottom, a first lateral side, an elongated slot in the first lateral side that forms a lateral passageway into the cell, the elongated slot having a width that is greater than the width of the fuel assembly and less than the diagonal of the fuel assembly; b) positioning the fuel assembly laterally adjacent to the elongated slot of the fuel rack so that the axis of the fuel assembly is substantially aligned with the elongated slot, the fuel assembly being in a first rotational position about the axis that allows the fuel assembly to pass through the elongated slot; c) translating the fuel assembly in a lateral direction through the elongated slot and into the cell; and d) rotating the fuel assembly for an angle Θ about the axis of the fuel assembly to a second rotational position so that the fuel assembly is prohibited from being translated back through the slot.

In another aspect, the invention can be a method of loading nuclear fuel assemblies into a fuel rack in a submerged environment comprising: a) submerging a nuclear fuel assembly having an axis and a horizontal cross-section in a pool; b) providing a fuel rack in the pool, the fuel rack comprising a body structure comprising at least one elongated cell, a top, a bottom, a first lateral side, at least one elongated slot in the first lateral side that forms a lateral passageway into the cell; c) positioning the fuel assembly laterally adjacent to the elongated slot of the fuel rack so that the axis of the fuel assembly is substantially aligned with the elongated slot; and d) translating the fuel assembly in a lateral direction through the elongated slot and into the cell.

DISCLOSURE OF THE INVENTION

Figure 1:
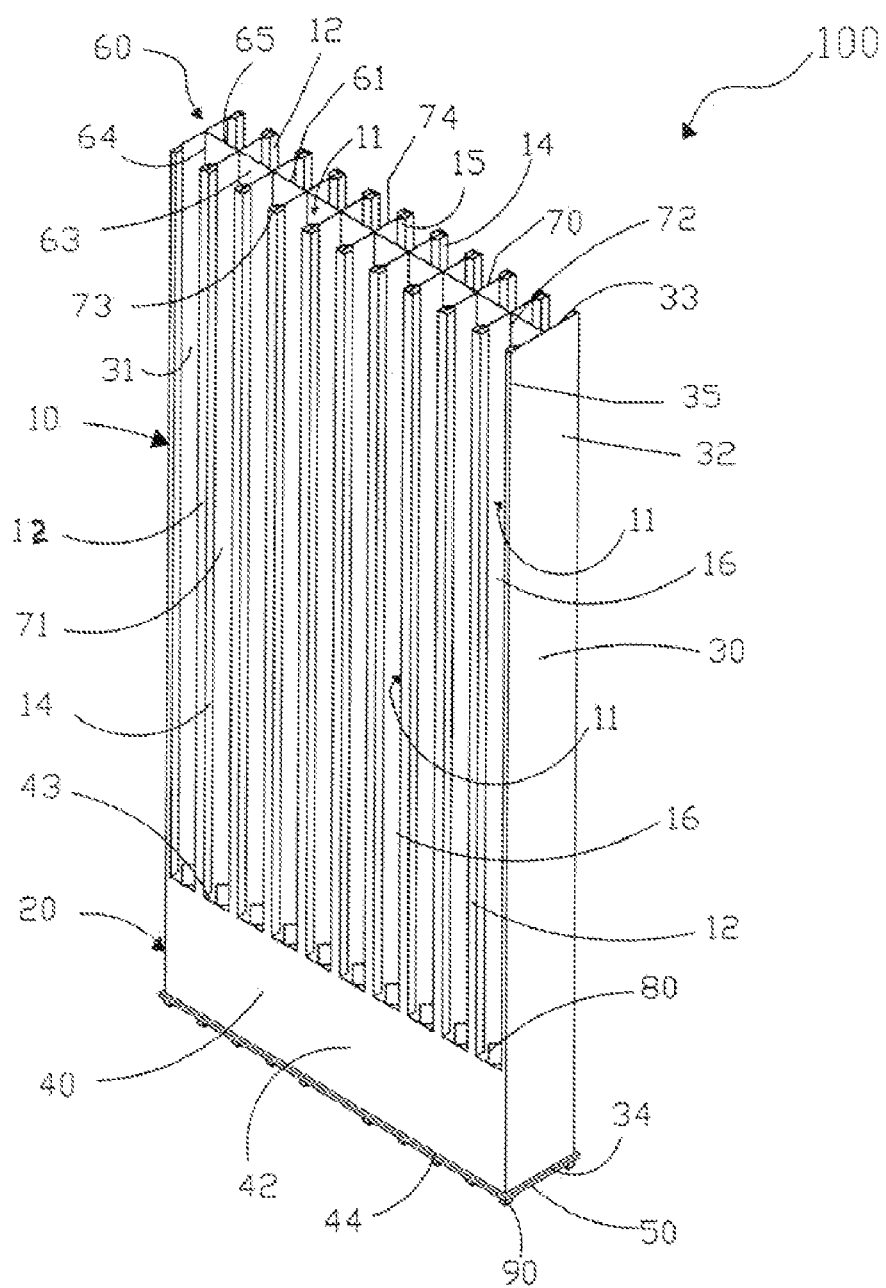
FIG. 1 is a perspective view of a fuel rack according to one embodiment of the invention.

Referring to FIG. 1, a perspective view of the fuel rack 100 according to one embodiment of the present invention is disclosed. The fuel rack 100 is designed so that fuel assemblies can be laterally loaded into the fuel rack 100 (i.e. through its sides) while still achieving vertical storage of the fuel assemblies. Thus, unlike prior art fuel racks, the need to position the fuel assemblies above the fuel rack 100, in a stacked arrangement, during a loading procedure is eliminated.

The fuel rack 100 comprises a body portion 10 and a base portion 20. While the fuel rack 100 is described below with a theoretical delineation between the body portion 10 and the base portion 20, this delineation is done solely for ease of discussion and explanation of the fuel rack 100 and its function. Those skilled in the art will understand that the fuel rack 100 can be a unitary structure and/or an apparatus wherein some and/or all of its components/elements can traverse both the body and the base portions 10, 20 of the fuel rack 100.

The fuel rack 100 comprises two end walls 30, two lateral panels 40 aid a base plate 50. The two end walls 30 and the two lateral panels 40 are vertically oriented flat rectangular plates. The two end walls 30 have an inner surface 31, an outer surface 32, a top edge 33, a bottom edge 34 and lateral edges 35. Similarly, the two lateral panels 40 have an inner surface 41, an outer surface 42, a top edge 43 and a bottom edge 44. The two end walls 30 are connected to the two lateral panels 40 so as to form a structural assembly about the perimeter of the base plate 50. This structural assembly forms the housing structure of the base portion 20, which has a generally rectangular horizontal cross-sectional profile. The bottom edges 34 of the two end walls 30 and the bottom edges 44 of the two lateral panels 40 are connected to a top surface 51 (shown in FIG. 5) of the base plate 50. The height of the lateral panels 40 is less than the height of the end walls 30, thereby forming, in essence, a fuel rack with truncated side walls. Preferably, the height of the lateral panels 40 is equal to about 2 feet. Preferably, the height of the end walls 30 is equal to about 15 feet. Of course, other dimensions can be used, none of which are limiting of the present invention.

The two end walls 30 and the two lateral panels 40 are preferably made of austenitic stainless steel. However, other sufficiently rigid materials can be used so long as they are sufficiently corrosion resistant, structurally sound and provide the necessary shielding.

Figure 4:
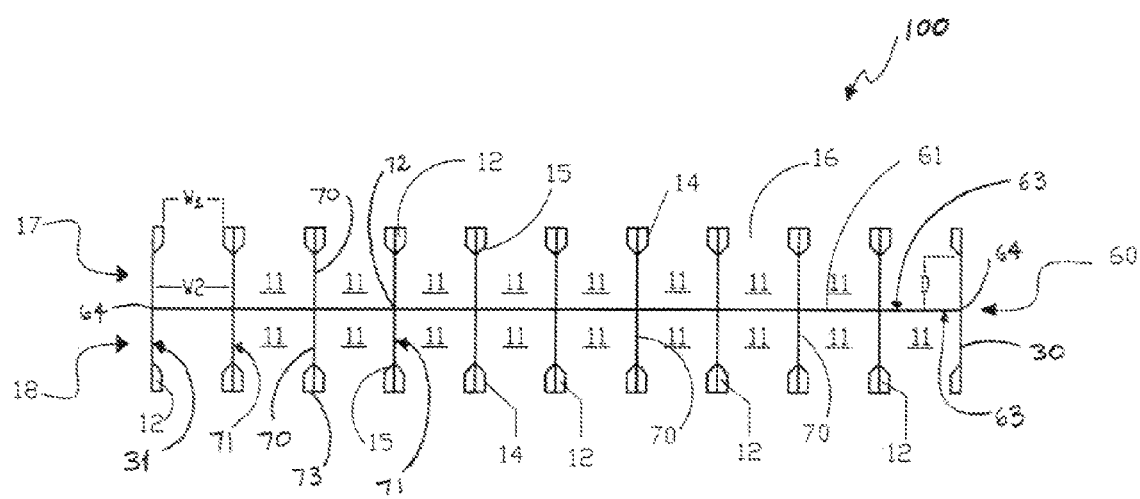
FIG. 4 is a cross sectional view along line B-B of FIG. 2.

Referring now to FIGS. 1 and 4 concurrently, the fuel rack 100 further comprises a primary plate 61 which is a vertically oriented flat rectangular plate comprising two opposing major surfaces 63, two opposing end edges 64, a top edge 65 and a bottom edge 66. The bottom edge 66 of the primary plate 61 is connected to the top surface 51 of the base plate 50 (shown in FIG. 6). The end edges 64 of the primary plate 61 are connected to the inner surfaces 31 of the end walls 30 so that the two major surfaces 63 of the primary plate 61 are substantially perpendicular with the inner surfaces 31 of the end walls 30. All connections between the various components of the fuel rack 100 are preferably achieved by welding. Of course, other connection means known in the art may be used.

The fuel rack 100 also comprises a plurality of secondary plates 70 which are also rectangular flat plates comprising two opposing major surfaces 71, a proximal lateral edge 72, a distal lateral edge 73, a top edge 74 and a bottom edge 75. The bottom edge 75 of each secondary plate 70 is connected to the top surface 51 of the base plate 50 (shown in FIG. 6) such that the secondary plates 70 are substantially vertically oriented.

The secondary plates 70 are positioned in a spaced relation with respect to one another and the inner surfaces 31 of the two end walls 30. The major surfaces 71 of the secondary plates 70 are substantially parallel with one another and the inner surfaces 31 of the end walls 30. The secondary plates 70 are positioned along each of the opposing major surfaces 63 of the primary plate 61 and extend perpendicularly therefrom. The proximal lateral edge 72 of each secondary plate 70 is connected to the major surface 63 of the primary plate 61 such that the major surfaces 71 of the secondary plate 70 are substantially perpendicular with the lateral surfaces 63 of the primary plate 61. Thus, the secondary plates 70 are connected to the primary plate 61 in a rectilinear configuration. Preferably, the primary plate 61 and the secondary plates 70 are made of austenitic stainless steel. However, the invention is not so limited and other materials can be used.

The primary plates 61 and the secondary plates 70 are arranged in an intersecting fashion so as to form a gridwork 60 that creates a plurality of elongated fuel cells 11. The opposing major surfaces 71 of two consecutive secondary plates 70 and the portion of the major surface 63 of the primary plate 61 that is between the two secondary plates 70 forms the general perimeter of a fuel cell 11. As will be discussed in greater detail below, the fuel cells 11 are substantially vertically oriented elongated cavities that are sized and shaped to receive and support a single fuel assembly in a vertical orientation.

The body portion 10 of the fuel rack 100 further comprises a plurality of retaining members 12. Two retaining members 12 are connected to each secondary plate 70 at or near the distal lateral edge 73. As will be discussed in further detail below, the retaining members 12 form a ridge/flange along the height of each fuel cell 11 mat assists in prohibiting properly loaded fuel assemblies from unintentionally falling out of the fuel cell 11 in the event of dislodgement. The retaining members 12 extend from the top edge 74 of the secondary plates 70 to the top edge 43 of the lateral panel 40 (best seen in FIGS. 2 and 5. The invention is not so limited, however, and in some embodiments the retaining members 12 may be segmented or may have a height that is a fraction of the height of the secondary plates 70 (and the fuel cell 11), etc. In still another embodiment, the retaining members 12 could be pins, dowels, etc.

Each retaining member 12 comprises an opposing horizontal end surface 14 and an opposing angled end surface 15. The surfaces 14, 15 are connected with each other so that the retaining member 12 has a horizontal cross sectional profile that forms one half of an irregular pentagon. Preferably, the retaining members 12 ate formed from the secondary plate 70. The invention is not so limited, however, and the retaining members 12 could be a structure made of plates connected to the secondary plate 70. The horizontal end surfaces 14 of the retaining members 12 are parallel with the major surfaces 71 of the secondary plates 70. The retaining members 12 are connected to the major surfaces 71 of the secondary plates 70. The angled surfaces 15 of the retaining members 12 minimizes intrusion into the cells 11, thereby maximizing usable space. As will be discussed in further detail below, the horizontal end surfaces 14 of the retaining members 12 provide a smooth surface so that the fuel assemblies are not damaged during loading into the fuel cell 11 and the angled surfaces 15 also help guide the fuel assemblies during an unloading cycle.

The gaps between each set of opposing horizontal surfaces 14 of the retaining members 12 form elongated slots 16. In essence, the retaining members 12 form the slots 16 therebetween. Each slot 16 provides a passageway from fee exterior of the fuel rack 100 into one of the fuel cells 11. The slots 16 are vertically oriented and elongated in nature. A single slot 16 is provided for each cell 11. As with the cells 11, only a few of the slots 16 are numerically identified in FIG. 1 to avoid clutter. The slots 16 extend substantially the entire length of the body portion 10 along the opposite lateral sides of the fuel rack 100. As will be discussed in greater detail below, the dimensions of the slots 16 are specifically selected/designed to allow a fuel assembly to be horizontally translated into the fuel cell 11 when the fuel assembly is in a first rotational position and to prohibit the fuel assembly from being horizontally translated through the slots 16 when the fuel assembly is in a second rotational position.

Figure 8:
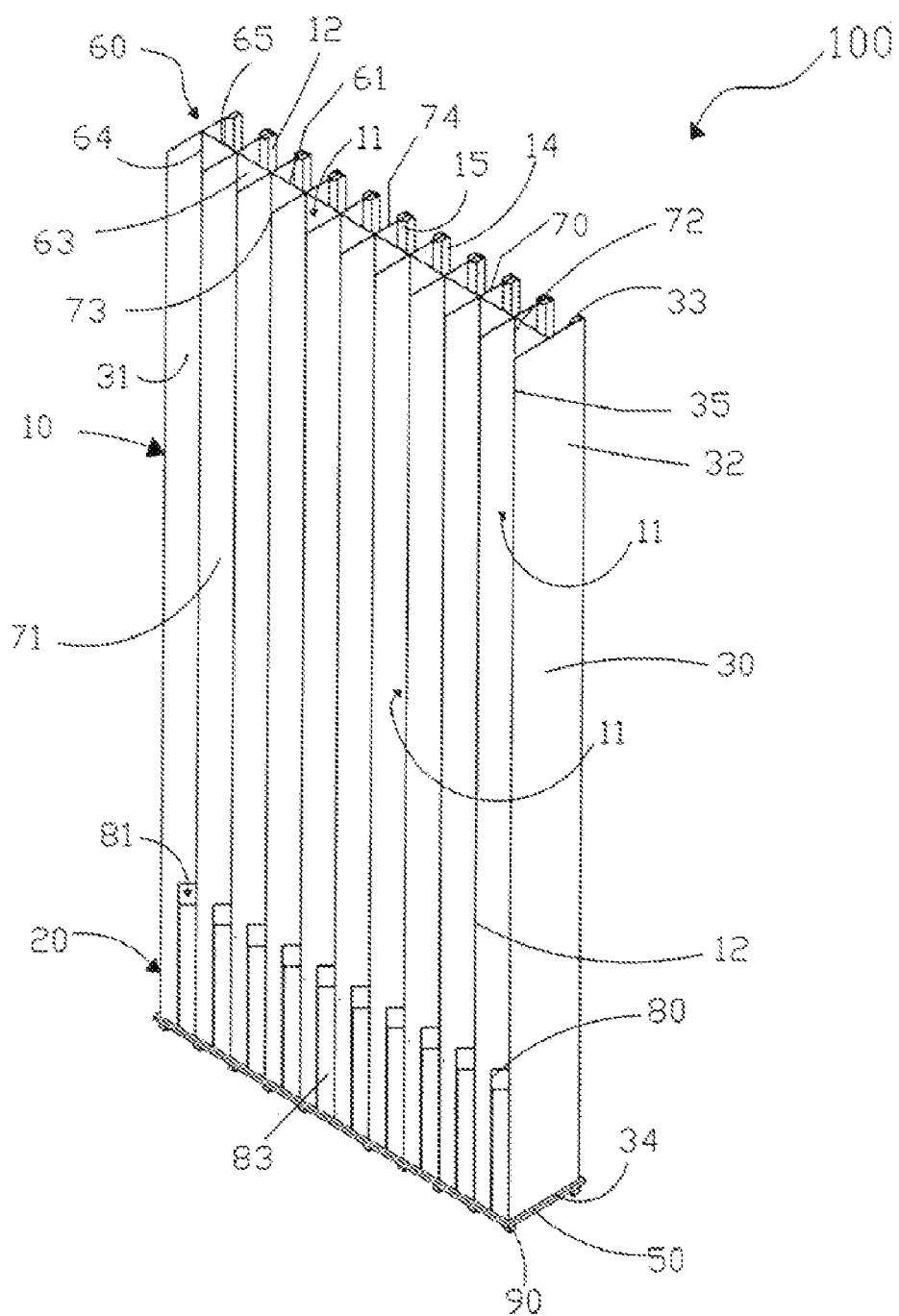
FIG. 8 is a cut-away view of the fuel rack of FIG. 1 with one of the bottom panels removed so that the stabilizers can be seen.

The base portion 20 comprises the base plate 50, the lateral panels 40 and a plurality of stabilizers 80 (visible in FIG. 8). The base portion 20 (and its components) serve the function of supporting and maintaining the fuel assemblies that are loaded into the cells 11 in a substantially vertical and spaced orientation once they are laterally loaded into the fuel rack 100 via the slots 16 and lowered. A stabilizer 80 is positioned at the bottom of each of the cells 11. As will be discussed in further detail below, the stabilizers 80 are designed to slidably receive an end portion of a fuel assembly and support the fuel assembly in a vertical orientation within the cells 11. The structural details of the stabilizers 80 will be discussed in greater detail with respect to FIG. 8.

Figure 2:
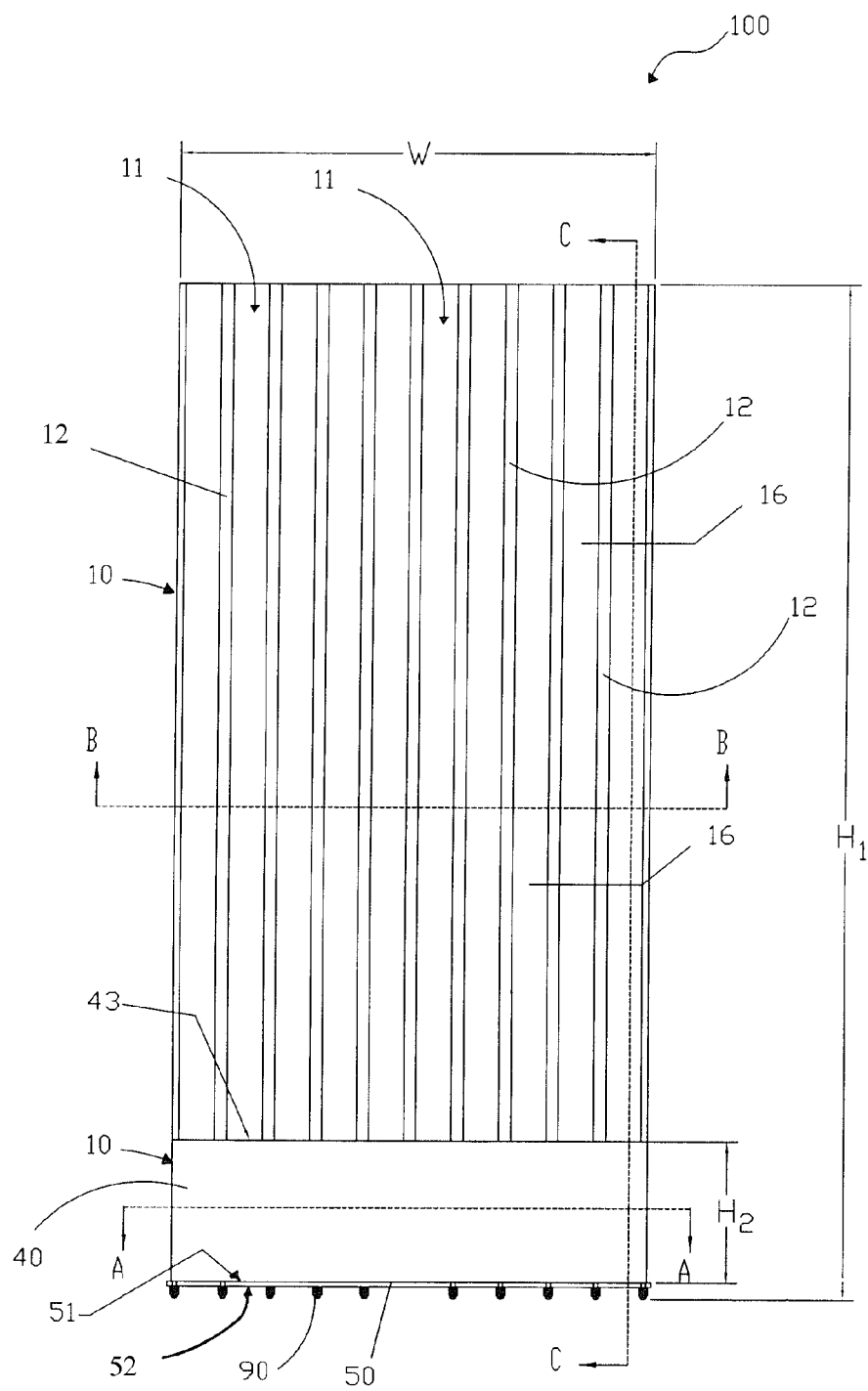
FIG. 2 is a side view of the fuel rack of FIG. 1.

Referring now to FIG. 2, a left side view of the fuel rack 100 is illustrated. The right side of the fuel rack 100 is identical. Preferably, the fuel rack 100 has a width W that is equal to about 7 feet and a height $H_1$ that is equal to about 15 feet. Of course, other dimensions can be used. Preferably, the panels 40 have a height $H_2$ that is equal to about 2 feet. Thus, for a fuel assembly to be loaded into the fuel rack 100, it need be raised only slightly above 2 feet to clear the top edge 43 of the lateral panel 40 and enter the fuel cells 11 via the slots 16. The invention is not limited to any particular dimensions however, so long as it can perform its intended function.

As can be seen clearly in FIG. 2, the retaining members 12 form the slots 16 therebetween. In the illustrated embodiment, the retaining members 12 form ten elongated slots 16 on each lateral side of the fuel rack 100. The invention, however, is not limited to any specific number of components. The retaining members 12 (and thus the slots 16) extend from the top surface of the fuel rack 100 to the top edge 43 of the lateral panel 40 of the base portion 20. Thus, the slots 16 extend at least a major portion of the height of the cells 11.

The base plate 50 forms the floor for each of the cells 11. The base plate 50 is a rectangular flat plate that is preferably made of austenitic stainless steel. The invention is not so limited however, and other materials and shapes may be used.

The fuel rack 100 further comprises a plurality of adjustable anchors 90. The anchors 90 are connected to the bottom surface 52 of the base plate 50. The fuel rack 100 comprises ten anchors 90 per side, however the invention is not limited to any particular number of anchors 90 so long as the stability of the fuel rack 100 is maintained. The anchors 90 thread into embedments in a pool floor and maintain a space between a bottom surface of the fuel rack 100 and the pool floor so that a sufficient fluid flow area underneath the base plate 50 is maintained. This affords the possibility of storing fuel assemblies with a high heat load in the fuel rack 100 if it were to become necessary. The anchors 90 are connected to the bottom surface of the base plate 50 via any suitable connection technique including welding, threading, etc. The anchors 90 are preferably connected to the base plate through suitably sized continuous fillet welds. The structural detail of the anchors 90 will be described in more detail wife respect to FIG. 6.

Figure 3:
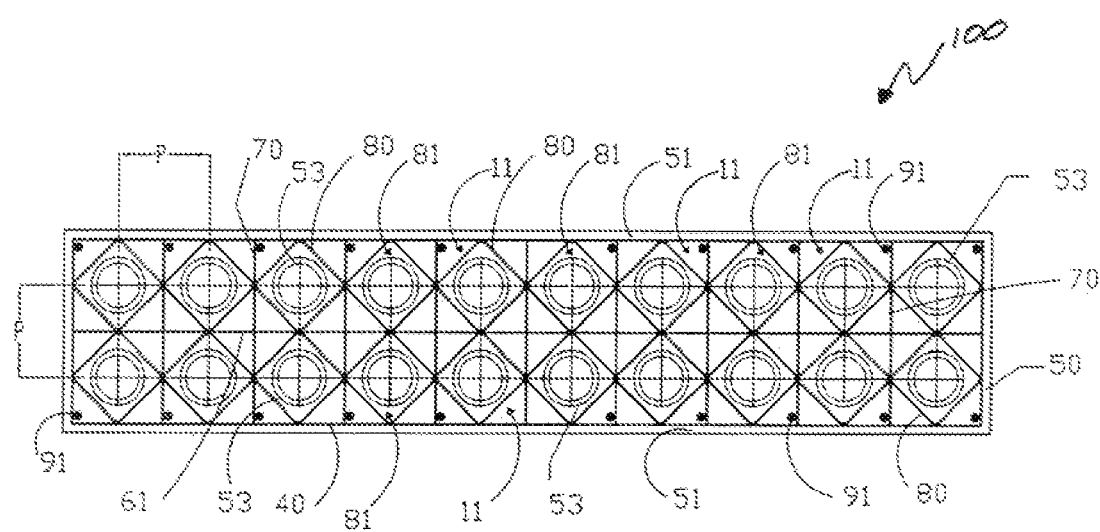
FIG. 3 is a cross sectional view along line A-A of FIG. 2.

Referring now to FIG. 3, a cross-section of the fuel rack 100 is shown along view A-A of FIG. 2 so that the internal detail and components of the base portion 20 of the fuel rack 100 can be identified and described. As mentioned above, a stabilizer 80 is positioned at the bottom of each cell 11. Each stabilizer 80 forms a stabilizing cavity 81 (discussed in relation to FIGS. 8 and 9 below) that slidably receives and supports an end portion of a fuel assembly. The stabilizer 80 is a structure having a rectangular horizontal cross-sectional profile. The stabilizers 80 are positioned on the base plate 50 so as to form a diamond within the rectangular cell 11. The orientation of fee stabilizer cavities 81 (i.e. diamond) results in a pitch P that is large enough (and/or an increased amount of space between adjacent fuel assemblies stored in the fuel rack 100) so that neutron absorbers may not be needed for reactivity control. Preferably the pitch P is equal to about 8 inches. The corners of the stabilizers 80 are in contact with and may be welded to the secondary plates 70, the primary plate 61 and the lateral panels 40 as necessary.

The base plate 50 further comprises an array of design features in the form of tapered depressions 53 on the top surface 51. The tapered depressions 53 aid in stabilizing and orienting the fuel assemblies within the cells by interacting with the bottom surfaces of the fuel assemblies. In other words, the depressions 53 serve as the seating surface for the bottom of a fuel assembly that is loaded into the cell 11. The depressions 53 are centrally located at the bottom of each cell 11 (and thus each stabilizing cavity 81). The structural detail of the depressions 53 will be discussed in further detail with respect to FIG. 6 below.

The base plate 50 further comprises a plurality of anchor holes 91 that allow access to the anchors 90 via the top surface 51 of the base plate 50. The anchor holes 91 are aligned with the anchors 90 and are preferably ¾ inches in diameter.

Referring now solely to FIG. 4, a cross-section of the fuel rack 100 along view B-B is shown so that the details of the rectangular gridwork 60 of the fuel cells 11 and the slots 16 can be clearly seen. The gridwork 60 forms a honeycomb-like arrangement of the cells 11. The cells 11 comprise a first row 17 of fuel cells 11 and a corresponding second row 18 of fuel cells 11. In the illustrated embodiment, there are two rows 17, 18 each consisting of ten fuel cells 11 for a total of twenty fuel cells 11. The invention, however, is not so limited and the fuel rack 100 can comprise any desired number of fuel cells 11. The number and arrangement of the fuel cells 11 used for any specific fuel rack 100 will be dictated by the storage needs of the facility in which it is to be used and the size of the pool it is to be used in. As discussed previously, the gridwork 60 of cells 11 is formed by a plurality of intersecting plates comprising the primary plate 61 and a plurality of secondary plates 70. The primary plate 61 separates the first row 17 and the second row 18 of fuel cells 11 while the secondary plates 70 separate the fuel cells 11 of the first row 17 from one another and the fuel cells 11 of the second row 18 from one another.

The elongated slots 16 are formed between the retaining members 12, thus there is a first set of slots 16 that provides lateral access into the first row 17 of the cells 11 through a first lateral side 101 (shown in FIG. 7) of the fuel rack 100 and a second set of the slots 16 that provides lateral access into the second row 18 of the fuel cells 11 through a second lateral side 102 (shown in FIG. 7) of the fuel rack 100. The slots 16 are oriented so their widths are substantially parallel to the primary plate 61. In the present embodiment, the retaining members 12 are welded to the secondary plates 70. Retaining members 12 are also welded to the end walls 30. These retaining members 12 function in the same way as the retaining members 12 connected to the secondary plates 70. The retaining members 12 form a flange/ridge on each of the sidewalls of the cells 11, thereby forming a slot 16 that is more narrow than the cells 11. More specifically, the width $W_2$ of the fuel cell 11 is greater than the width $W_1$ of the slot 16. In one embodiment, the width $W_2$ is equal to about 8 inches and $W_1$ is equal to about 6 inches. Additionally, it is preferable that the distance D between the lateral surface 63 of the primary plate 61 and the angled surface 15 retaining member 12 be equal to about 5 inches. The invention is not so limited however, and the dimensions of the slots 16 and the fuel cells 11 is dependent upon the size and shape of the fuel assemblies to be stored therein.

Figure 5:
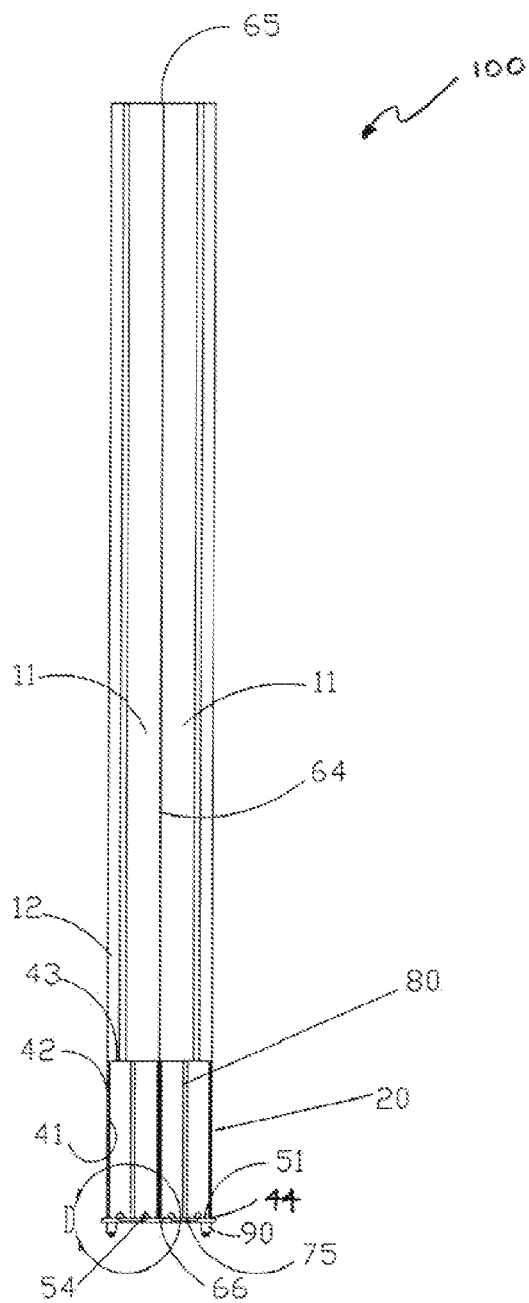
FIG. 5 is a cross sectional view along line C-C of FIG. 2.

Referring now to FIG. 5, a cross-section of the fuel rack 100 along view C-C of FIG. 2 is illustrated. The base portion 20 further comprises a plurality of flow holes 54 located near the bottom edge 75 of the secondary plates 70. The flow holes 54 are semi-circular shaped cutouts in the secondary plates 70 that allow water to flow therethrough. The flow holes 54 provide cooling, and ease of submersion for the fuel rack 100. Preferably, there are four flow holes 54 per fuel cell 11. The invention is not so limited however, and the shape, size and amount of flow holes could be changed.

Figure 6:
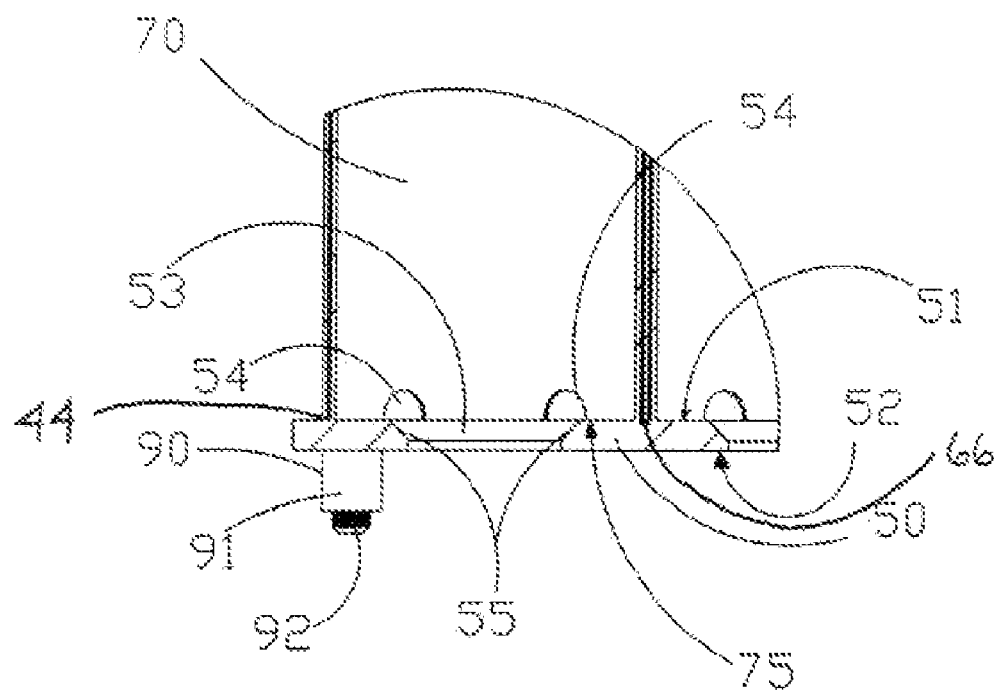
FIG. 6 is a close up view of area D of FIG. 5.

Referring now to FIG. 6, the structural detail of area D of FIG. 5 is illustrated. The anchors 90 are positioned near the lateral edges of the base plate 50. The anchors 90 comprise an internally threaded sleeve 91 and an externally threaded spindle 92. The sleeve 91 is preferably made from austenitic stainless steel. The spindle 93 is preferably made from a high strength alloy such as A564-630 or SA564-630 precipitation hardened stainless steel.

The tapered depressions 53 in the baseplate 50, which serve as the seating surface of a fully loaded fuel assembly, contain chamfered surfaces 55. The centerline of the depressions 53 define the geometrical axis of symmetry for each cell 11. While a single depression per cell 11 is illustrated, in other embodiments, a plurality of depressions can be supplied. The tapered depressions 53 could alternatively be holes in the base plate 50 having chamfered surfaces if desired. Additionally, rather than depressions 53, the fuel rack 100 could comprise a ring-like protrusion, or a plurality of protrusions that would engage the bottom of a fuel assembly loaded therein. The depressions 53 preferably overlap with the flow holes 54 so that fluid can flow directly over a fuel assembly sitting in the depression 53.

Figure 7:
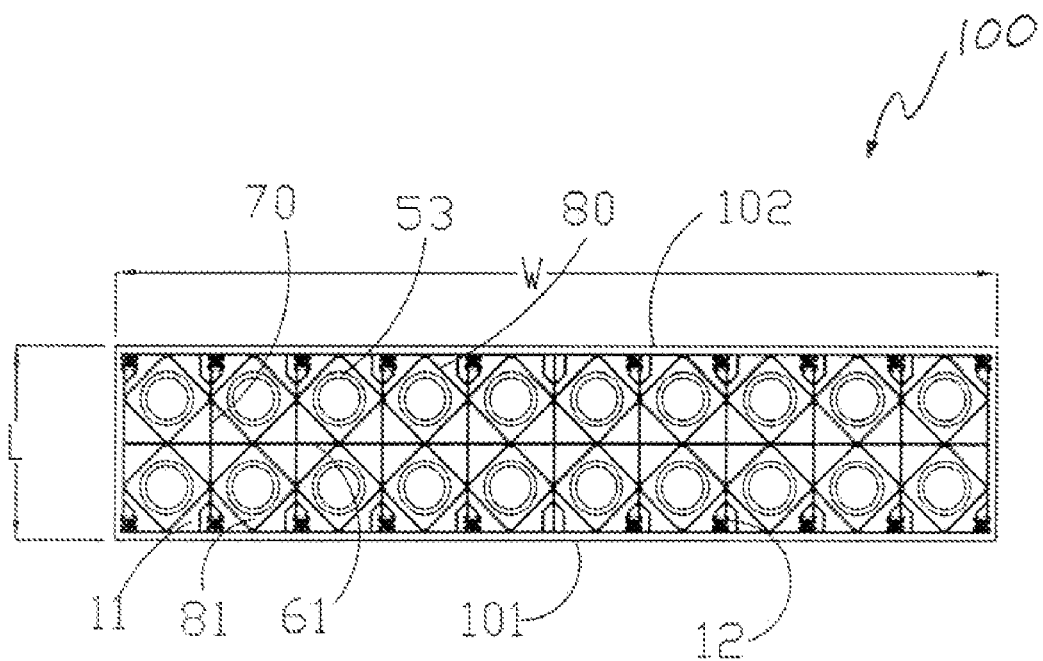
FIG. 7 is a top view of the fuel rack of FIG. 1.

Referring to FIG. 7, a top view of the fuel rack 100 is illustrated. The fuel rack 100 is designed to hold twenty fuel assemblies in a substantially vertical orientation while maintaining sufficient distance between each fuel assembly so as to not require neutron absorbers between the cells 11. As can be seen, the depressions 53 are centered within the cavity 81 formed by the stabilizer 80. The stabilizer 80 is in turn centered within the fuel cell 11 so that a fuel assembly loaded therein will also be centered in the fuel cell 11. Preferably, the fuel rack 100 has a width W equal to about 7 feet and a length L equal to about 1.5 feet. The invention is not so limited, however.

Figure 9:
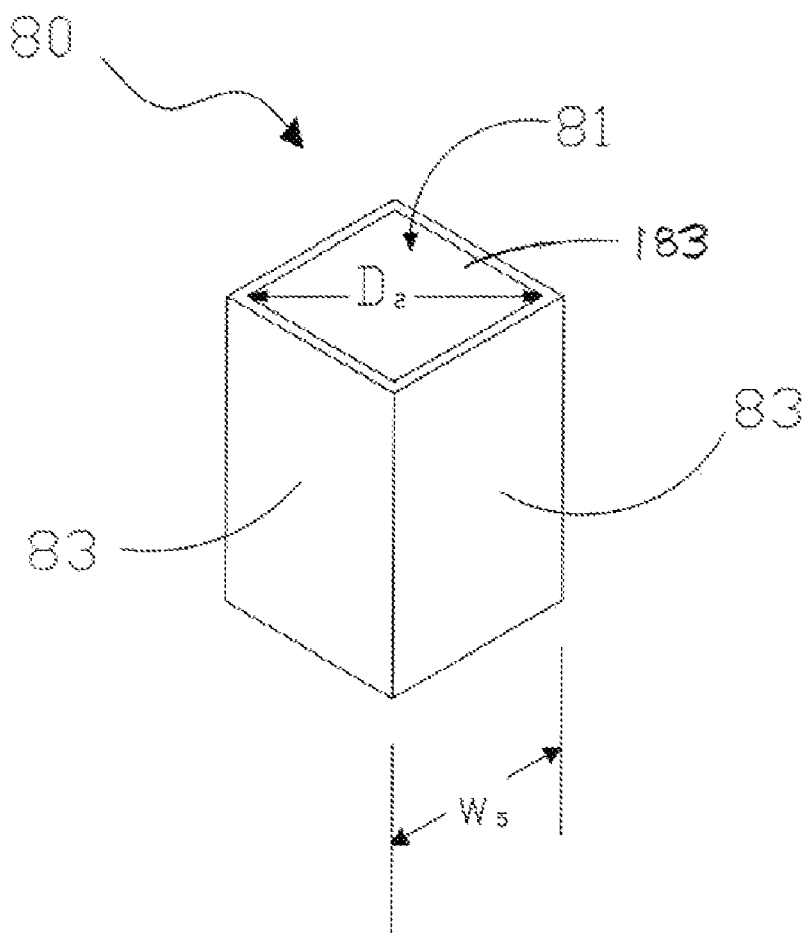
FIG. 9 is a perspective view of an embodiment of a stabilizer used in the fuel rack of FIG. 1 according to an embodiment of the present invention.

Referring to FIGS. 8 and 9 concurrently, the stabilizers 80 will be described in further detail. In FIG. 8 the lateral panels 40 and the retaining members 12 are cutaway so that the position of the stabilizers 80 in the cells 11 can be seen. The stabilizers 80 are positioned at the bottom of each cell 11 atop the base plate 50 in the orientation illustrated in FIG. 9 The stabilizers 80 are formed of flat plates 83 that are connected at their edges to form a rectangular-shaped structure. The flat plates 83 are attached to the base plate 50 in a vertical orientation. The flat plates 83 are preferably made of austenitic stainless steel and are preferably attached to the base plate 50 by fillet welds.

Each stabilizer 80 comprises a stabilizer cavity 81 for slidably receiving and supporting an end portion of a fuel assembly. The stabilizer cavities 81 have a horizontal cross-sectional profile that corresponds in size and shape with the horizontal cross-sectional profile of the fuel assembly to be loaded therein. A small tolerance is allowed for ease of loading.

The stabilizer 80 has an open top end 183 and a closed bottom end/floor (formed by the base plate 50). In other embodiments, the bottom end may also be open by providing holes in the base plate 50. The open top end 183 of each stabilizer 80 is in spatial communication with the remaining volume of the fuel cell 11 in which it is positioned, thereby allowing a fuel assembly to be vertically supported by the stabilizer 80 and extend into the cell 11. The stabilizer plates 83 are positioned atop the base plate 50.

The non-circular nature of horizontal cross-sectional of the internal perimeter of the stabilizer cavity 81 prevents a fuel assembly that is loaded therein from rotating along its vertical axis to align with the slot 16. Stated another way, the fuel assembly must be lifted out of the stabilizer cavity 81 by a fuel handler in order to be rotated so that it can be removed via the slots 16.

Figure 10:
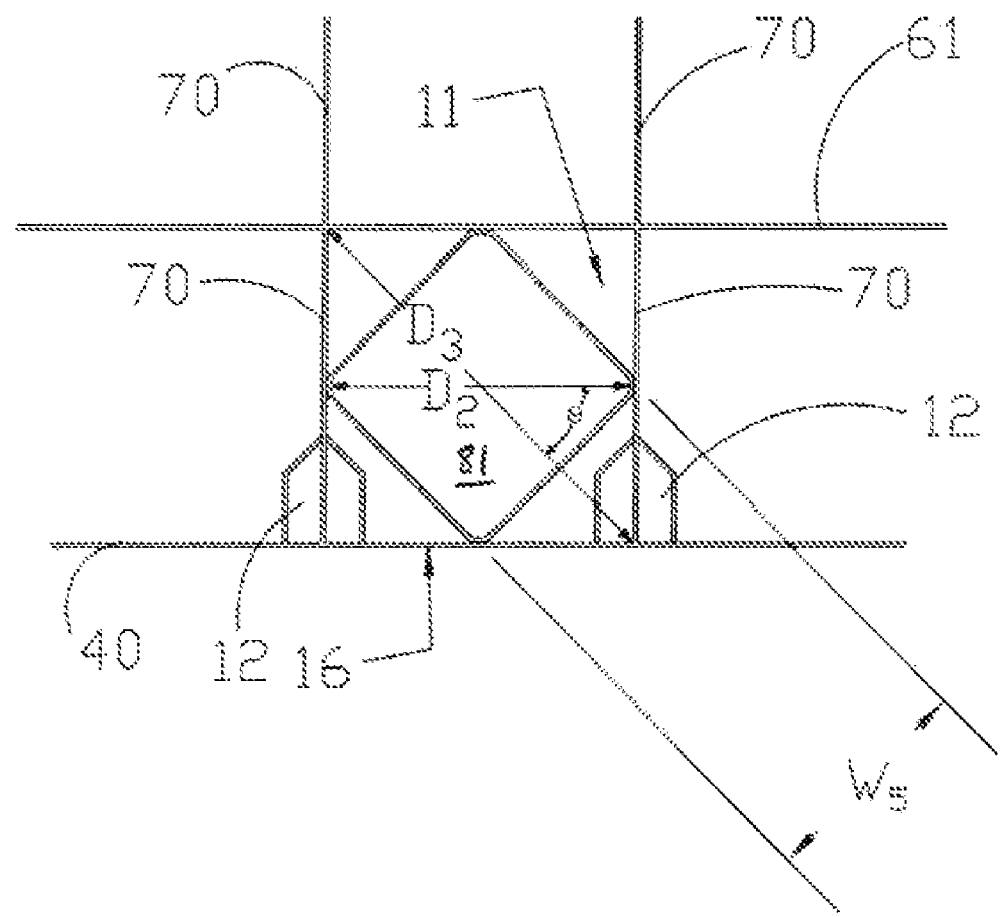
FIG. 10 is a top view of one of the cells of the fuel rack of FIG. 1 showing the relative dimensional details of the cell and the stabilizer according to an embodiment of the present invention.

Referring to now to FIG. 10, the preferred geometric relationship between the stabilizer cavity 81 and the fuel cells 11 will be described. The stabilizer cavity 81 has a rectangular cross-sectional profile having a diagonal $D_2$. The fuel cells 11 have a rectangular cross-sectional profile having a diagonal $D_3$. The stabilizer 80 is preferably positioned within the cell 11 so that the diagonals $D_2$, $D_3$ intersect at an angle θ that is not zero. By positioning the stabilizers 80 in the cells 11 so that the diagonals $D_2$, $D_3$ intersect at a nonzero angle θ, it is ensured that a loaded fuel assembly that is resting in the stabilizer cavity 81 can not be removed through the slot 16. This will be described in greater detail below. In the present embodiment, the stabilizers 80 are positioned in the cells 11 so that the angle θ is equal to about 45 degrees. Those skilled in the art however, will appreciate that the angle θ is not so limited.

Figure 12A:
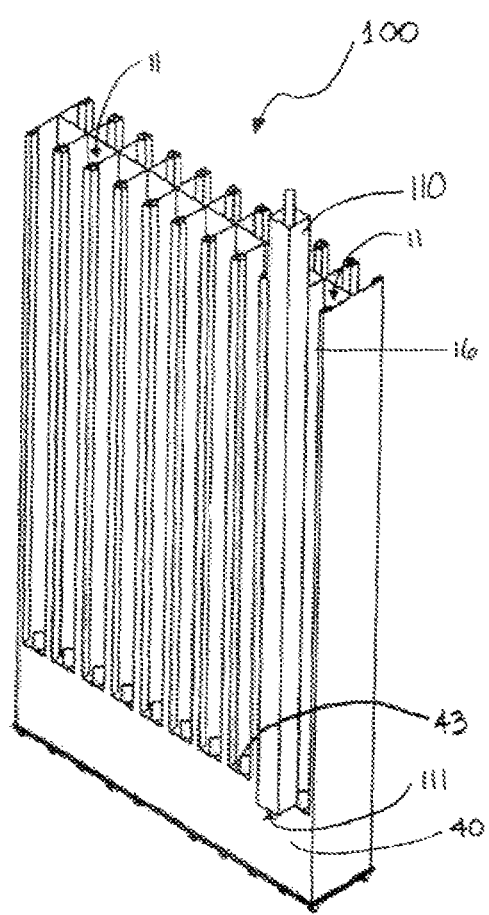
FIG. 12A is a perspective view of the fuel rack of FIG. 1 wherein a fuel assembly is positioned laterally adjacent to the fuel rack in a first rotational position for lateral loading, according to an embodiment of the present invention.
Figure 12B:
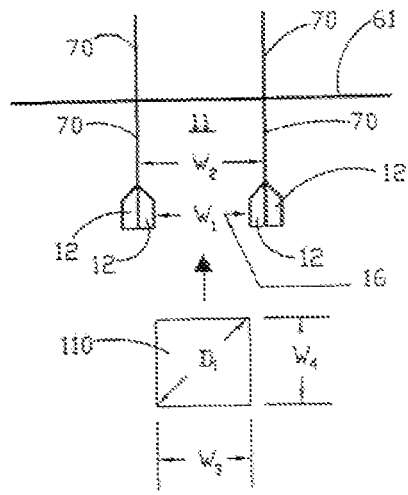
FIG. 12B is a top view of FIG. 12A showing the relative dimensions of the cell, the slot and the fuel assembly, according to an embodiment of the present invention.

Referring to FIG. 12B, the slots 16 have a first width $W_1$ and the fuel cells 11 have a second width $W_2$. The first width $W_1$ is smaller than the second width $W_2$. The dimension of the cells 11, slots 16, and stabilizer cavities 81 are determined by the fuel assemblies to be stored. The fuel assemblies 110 have a horizontal cross sectional having a third width $W_3$ by a fourth width $W_4$ forming a diagonal $D_1$. The first width $W_1$ is greater than the third width $W_3$ and less than the diagonal width $D_1$. The second width $W_2$ is greater than the diagonal width $D_1$. The relative dimensions of the slots 16, the fuel cells 11 and the fuel assembly 110 are such that the fuel assembly 110 can be laterally loaded through the slot 16 into the fuel cell 11 wherein a first rotational position, then the fuel assembly 110 can be rotated along the vertical axis within the fuel cell 11 to a second rotational position. Once the fuel assembly is rotated, it cannot be translated back through the slot 16 and out of the fuel cell 11 because $D_1$ is larger than $W_1$. In the present embodiment, a fuel assembly rotated along the vertical axis by 45 degrees relative to the slot 16 will be too wide to fit back through the slot. The invention, however is not so limited. The amount of rotation will vary according to the dimensions of the fuel assembly to be loaded, the width of the fuel cell 11 and the width of the slot 16.

Figure 11:
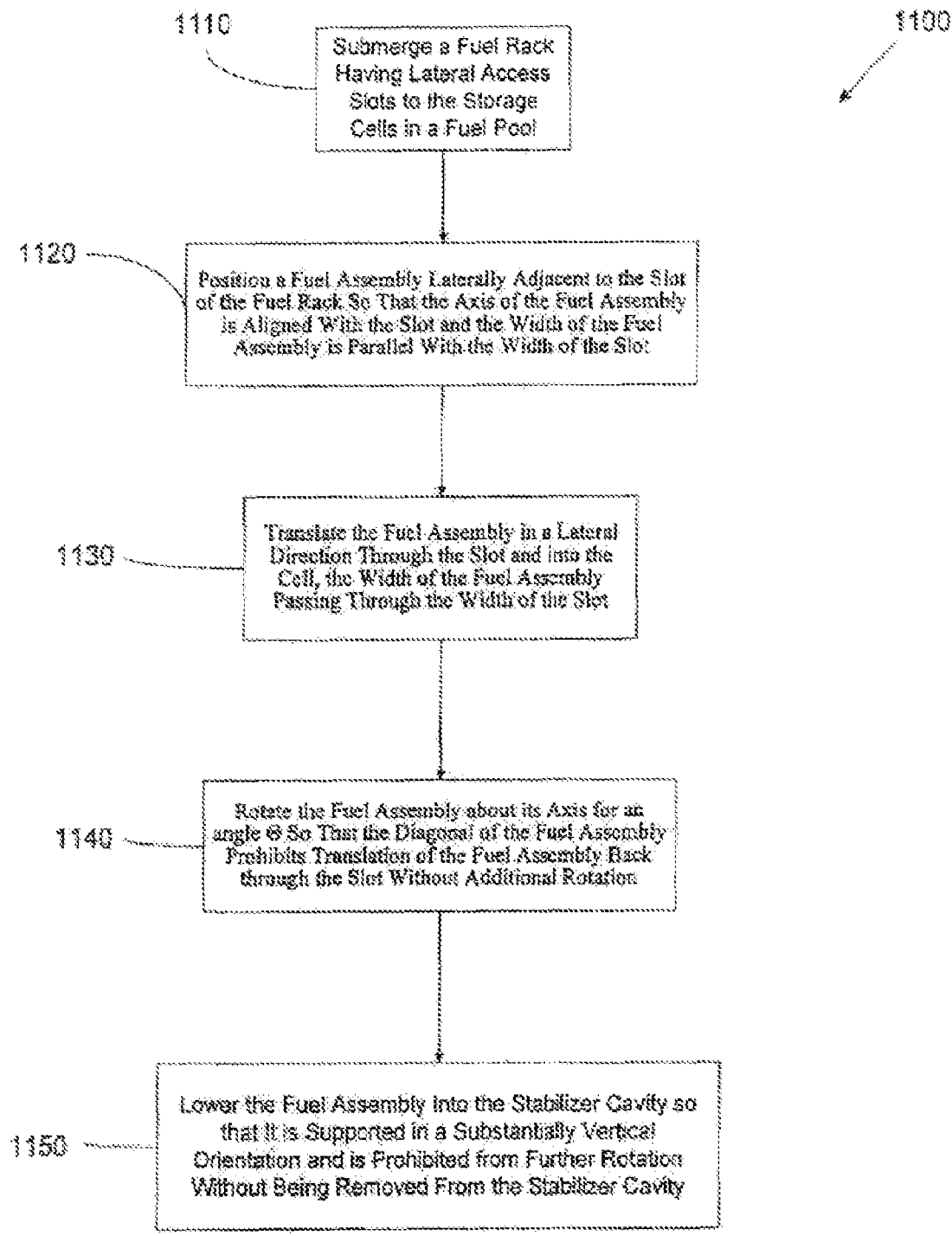
FIG. 11 is a flow chart of a method of laterally loading fuel assemblies into a fuel rack according to an embodiment of the present invention.

FIG. 11 is a flowchart of an embodiment of a method of the present invention. For ease of understanding the method will be described in reference to the fuel rack 100 as illustrated in FIGS. 12A-15. Those skilled in the art, however, will understand that the method is not limited to the fuel rack 100. Of course, other structures can be utilized so long as the intended function is achieved.

A fuel rack 100 having a plurality of slots 16 that provide lateral access into the storage cells 11 is submerged in a fuel pool and adequately secured to the floor thereby completing step 1110 of method 1100.

Once step 1110 is completed, a submerged fuel assembly 110 is positioned laterally adjacent to the slot 16 of the fuel rack 100 in a first rotational orientation, as shown in FIGS. 12A and 12B. The fuel assembly 110 is preferably lifted only a minimum distance above the top edge 43 of the lateral plates 40. The fuel assembly 110 is preferably lifted so that the bottom 111 of the fuel assembly 110 is to a height off the floor of the pool that is less than ½ of the height of the fuel assembly 110, more preferably less than ¼ its height and most preferably less than ⅕ its height. The vertical axis of the fuel assembly 110 is aligned with the center line of the slot 16 in the first rotational orientation. When in the first rotational orientation, the width of the fuel assembly $W_3$ 110 is parallel with the width $W_1$ of the slot 16. As such, step 1120 of method 1100 is completed.

Figure 13A:
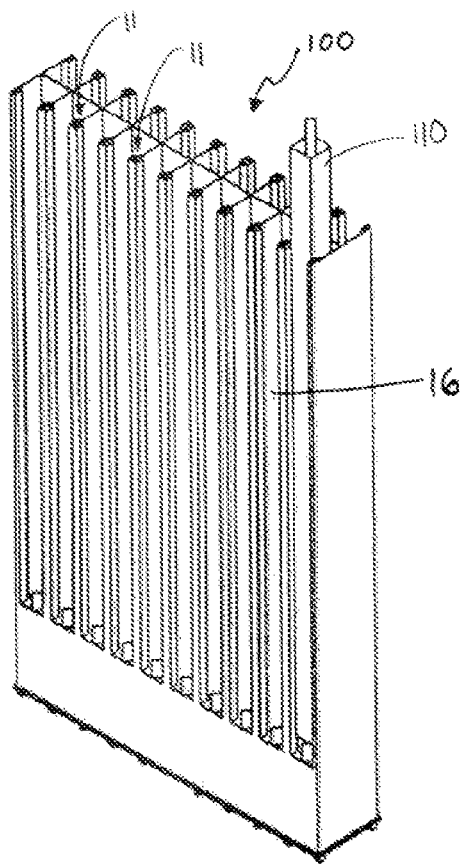
FIG. 13A is a perspective view of the fuel rack of FIG. 1 wherein the fuel assembly has been horizontally translated into the cell of the fuel rack of FIG. 1 while maintaining the first rotational position, according to an embodiment of the present invention.
Figure 13B:
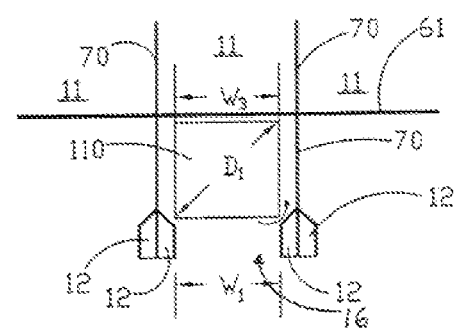
FIG. 13B is a top view of the partially loaded cell of the fuel rack of FIG. 13A, according to an embodiment of the present invention.

Once step 1120 is completed, the fuel assembly 110 is horizontally translated in a lateral direction through the slot 16 and into the cell 11, as shown in FIGS. 13A and 13B. Because the width $W_3$ of the fuel assembly 110 is smaller than the width $W_1$ of the slot 16, the fuel assembly 110 passes through the slot 16 in an unobstructed manner. As such, step 1130 of method 1100 is completed.

Figure 14A:
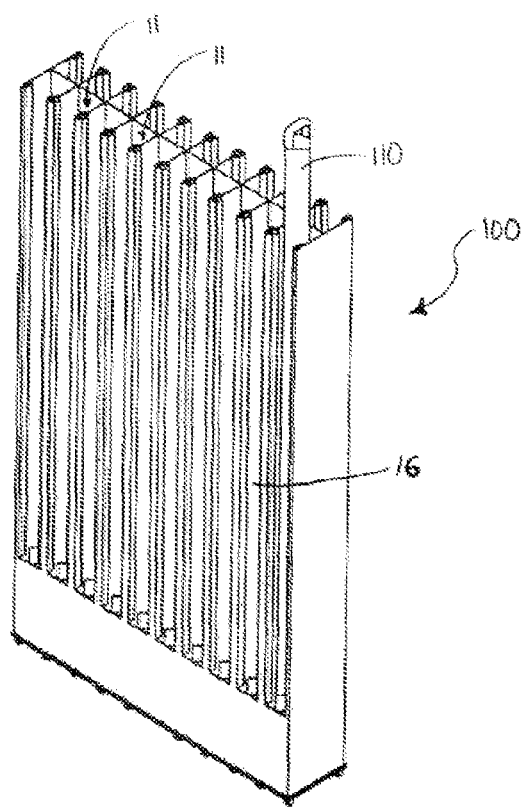
FIG. 14A is a perspective view of the fuel rack of FIG. 1 wherein the fuel assembly has been rotated along its vertical axis to a second rotational position within the cell so as to achieve an orientation where the fuel assembly can be lowered into the stabilizer and cannot be laterally removed from the cell without further rotation, according to one embodiment of the present invention.
Figure 14B:
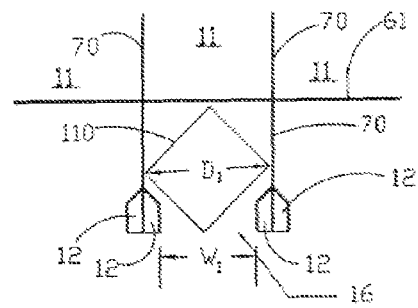
FIG. 14B is a top view of the partially loaded fuel cell of FIG. 14B, according to one embodiment of the present invention.

Once step 1130 is completed and the fuel assembly 110 is completely within the cell 11, the fuel assembly 110 is rotated about its vertical axis for an angle θ until it reaches a second rotational orientation, as shown in FIGS. 14A and 14B. After the fuel assembly 110 is rotated into the second rotational position. The fuel assembly 110 is prohibited from translation back through the slot 16 without additional rotation. This is the result of the diagonal $D_1$ of the fuel assembly 110 being larger than the width $W_1$ of the slot 16. As such step 1140 is completed.

Figure 15:
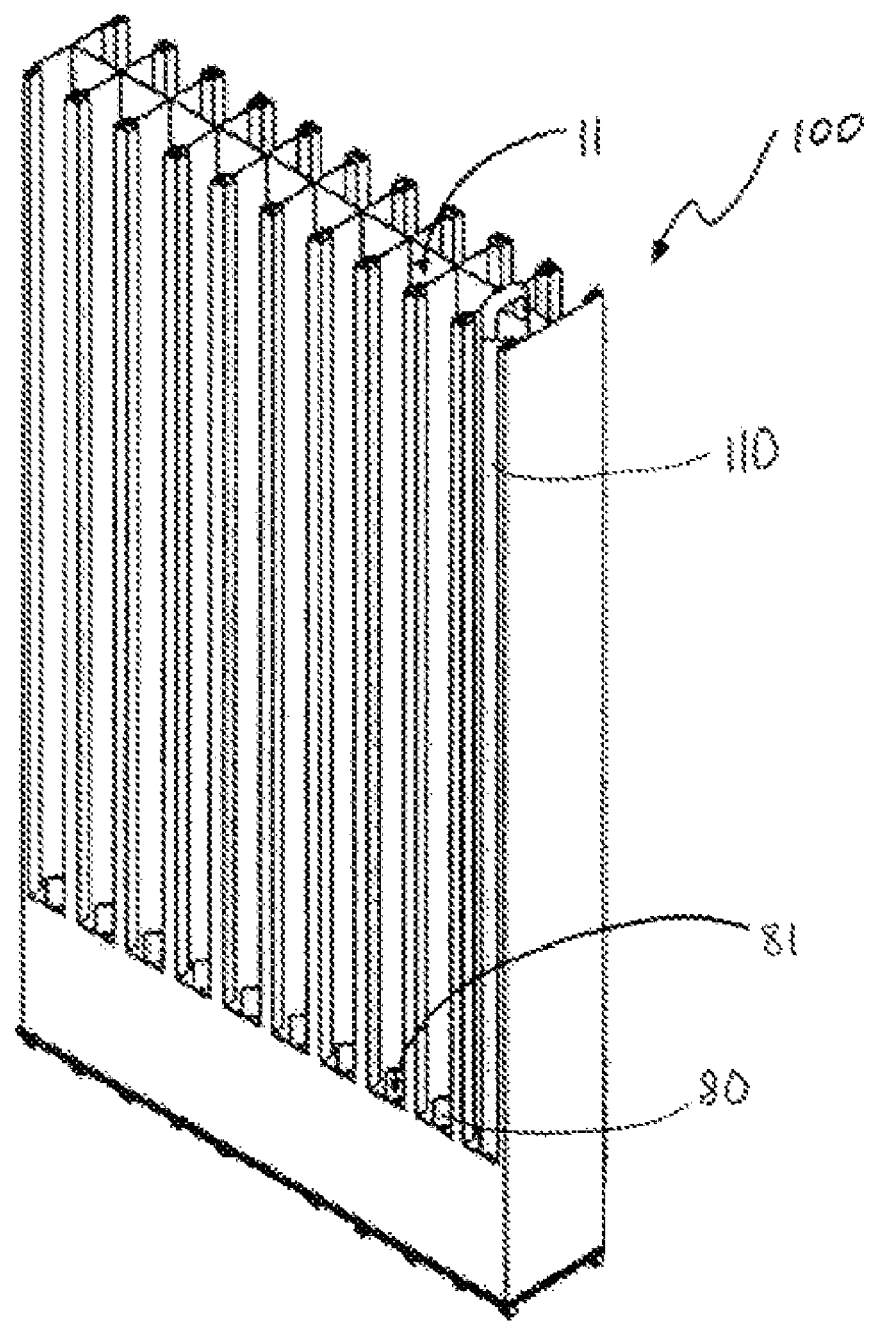
FIG. 15 is a perspective view of the fuel rack of FIG. 1 wherein the fuel assembly has been fully loaded into the fuel rack and lowered into a stabilizer that fully supports the fuel assembly in a vertical orientation, according to an embodiment of the present invention.

Referring now to FIG. 15, once step 1140 is completed, the fuel assembly 110 is lowered into the stabilizer cavity 81 so that it is supported in a substantially vertical orientation and is prohibited from further rotation without being raised out of and removed from the stabilizer cavity 81. As such, step 1150 is completed. The reverse steps are performed to remove the fuel assembly 110 from the fuel rack 100.

Whereas the present invention has been described in detail herein, it should be understood that other and further modifications, apart from those shown or suggested herein, may be made within the spirit and scope of the present invention. It is also intended that all matter contained in the foregoing description or shown in any accompanying drawings shall be interpreted as illustrative rather than limiting.

What is claimed is:

1. An apparatus fix supporting nuclear fuel assemblies comprising;
   a body structure comprising at least one substantially vertically oriented elongated cell for receiving a nuclear fuel assembly, the hod having a top, a bottom and a first lateral side;
   at least one elongated slot in the first lateral side of the body structure that forms a passageway into the cell through which a vertically oriented fuel assembly can be loaded; the elongated slot having a fixed size and being formed between a pair of substantially vertical retaining members so that (i) when the fuel assembly is in a first rotational position about a vertical axis, the fuel assembly can pass through the elongated slot in an unobstructed manner, and (ii) when the fuel assembly is in a second rotational position about the vertical axis, the fuel assembly can not pass through the elongated slot; and
   means for supporting the fuel assembly in the second rotational position within the cell in a substantially vertical orientation.

2. The apparatus of claim 1 further comprising:
   the body structure comprising a plurality of the substantially vertically oriented elongated cells; and
   a plurality of the elongated slots, one of the elongated slots forming a passageway into each of the cells.

3. The apparatus of claim 1 further comprising:
   a gridwork of plates that form a plurality of the cells; and
   a base plate, the gridwork of plates positioned atop the base plate.

4. The apparatus of claim 3 further comprising:
   the body structure having a second lateral side opposite the first lateral side;
   the gridwork of plates forming a first row of the cells and a second row of the cells;
   a plurality of the elongated slots in the first lateral side of the body structure forming passageways into the first row of the cells; and
   a plurality of the elongated slots in a second lateral side of the body structure forming passageways into the second row of the cells.

5. The apparatus of claim 1 wherein the support means comprises a stabilizer structure located at a bottom of the cell, the stabilizer structure having a cavity having an open top end in spatial communication with the cell, the cavity receiving an end of the fuel assembly awl preventing free rotation of the fuel assembly.

6. The apparatus of claim 5 wherein the cell has a rectangular horizontal cross sectional profile and the cavity has a substantially diamond-shaped horizontal cross-sectional profile.

7. The apparatus of claim 5 wherein the cell has a rectangular horizontal cross sectional profile having a first diagonal and the cavity has a rectangular horizontal cross-sectional profile having a second diagonal, and wherein first and second diagonals intersect at a nonzero angle Θ.

8. The apparatus of claim 1 wherein a floor of cell has a design feature for orienting the fuel assemblies within the cells.

9. The apparatus of claim 1 wherein the elongated slot has a first width and the cell has a second width, the first width being smaller than the second width.

10. The apparatus of claim 9 wherein the first width is greater than a width of a fuel assembly to be supported in the apparatus and less than a diagonal of the fuel assembly to be held in the apparatus.

11. The apparatus of claim 10 wherein the second width is greater than the diagonal of the fuel assemblies.

12. The apparatus of claim 1 wherein the cells have an open top end.

13. The apparatus of claim 1 further comprising:
   a gridwork of plates that form a first row of the cells and a second row of the cells;
   the gridwork of plates comprising a primary plate in a substantially vertical orientation, the primary plate separating the first row of the cells from the second row of the cells;

a plurality of the elongated slots in the first lateral side of the body structure forming passageways into the first row of the cells;

a plurality of the elongated slots in a second lateral side of the body structure forming passageways into the second row of the cells; and the gridwork of plates further comprising a plurality of substantially vertically orientated secondary plates connected to both sides of the primary plate in a rectilinear configuration, the secondary plates separating the cells of the first row of the cells from one another and separating, the cells of the second row of the cells from one another.

14. The apparatus of claim 13 wherein first lateral edges of the secondary plates are connected to the primary plate and second lateral edges of the secondary plates comprise a retaining member, the elongated slots being formed between the retaining members.

15. An apparatus for supporting radioactive fuel assemblies in submerged environment comprising:

a body structure comprising a plurality of elongated cells for receiving radioactive fuel assemblies, the body having a top, a bottom and a first lateral side;

a plurality of elongated slots in the first lateral side of the body structure, each elongated slot forming a lateral passageway into one of the plurality of cells, each elongated slot having a fixed size so that: (i) when the fuel assemblies are in a first rotational position about a vertical axis, the fuel assemblies can pass through the elongated slot in an unobstructed manner, and (ii) when the fuel assemblies are in a second rotational position about the vertical axis, the fuel assemblies can not pass through the elongated slot;

the elongated slots having a width that is less than a width of the cells; and means for supporting the fuel assemblies within the cells so that the fuel assemblies can nor freely rotate.

16. The apparatus of claim 15 further comprising:

the support means comprising a stabilizer structure located at a bottom of each of the cells, the stabilizer structures having a cavity having an open top end that is in spatial communication with the cell; and wherein the cell has a rectangular horizontal cross sectional profile having a first diagonal and the cavity has a rectangular horizontal cross-sectional profile having a second diagonal, and wherein first and second diagonals intersect at a nonzero angle $\Theta$.

17. A system for supporting spent nuclear fuel rods in a submerged environment comprising:

a fuel assembly housing for receiving one or more nuclear fuel rods, the fuel assembly having a vertical axis;

a body structure comprising at least one substantially vertically oriented elongated cell for receiving the fuel assembly housing, the body having a top, a bottom and a first lateral side;

at least one elongated slot in the first lateral side of the body structure that forms a passageway into the cell;

the elongated slot having a fixed size so that: (i) when the fuel assembly housing is in a first rotational position about the vertical axis, the fuel assembly housing can be translated through the elongated slot in an unobstructed manner, and (ii) when the fuel assembly housing is in a second rotational position about the vertical axis, the fuel assembly can not be translated through the elongated slot, the elongated slot having a first width greater than a width of the fuel assembly housing and less than a diagonal of the fuel assembly housing; and means for supporting the fuel assembly housing in the second rotational position within the cell in a substantially vertical orientation.

18. The system of claim 17 wherein the cell has a second width, the first width being smaller than the second width.

19. The system of claim 18 wherein the second width is greater than the diagonal of the fule assemblies.

* * * * *